United States Patent [19]
Takekado et al.

[11] Patent Number: 5,745,319
[45] Date of Patent: Apr. 28, 1998

[54] RECORDING/REPRODUCING APPARATUS WITH COARSE AND FINE HEAD POSITIONING ACTUATORS AND AN ELASTIC HEAD GIMBAL

[75] Inventors: Shigeru Takekado, Tokyo; Yasuo Ohtsubo, Yokohama, both of Japan

[73] Assignee: Kabushiki Kaisha Toshiba, Kawasaki, Japan

[21] Appl. No.: 429,575

[22] Filed: Apr. 27, 1995

Related U.S. Application Data

[63] Continuation of Ser. No. 100,993, Aug. 3, 1993, abandoned.

[30] Foreign Application Priority Data

Aug. 12, 1992 [JP] Japan .................. 4-214415
Mar. 3, 1993 [JP] Japan .................. 5-042869

[51] Int. Cl.⁶ ............................... G11B 5/596
[52] U.S. Cl. .......................... 360/78.05; 360/104
[58] Field of Search .................. 360/78.05, 109, 360/104

[56] References Cited

U.S. PATENT DOCUMENTS

| | | | |
|---|---|---|---|
| 3,924,268 | 12/1975 | McIntosh et al. | 360/78.05 |
| 4,614,986 | 9/1986 | LaBudde | 360/78.05 |
| 4,630,145 | 12/1986 | Thompson et al. | 360/78.05 X |
| 4,858,040 | 8/1989 | Hazebrouck | 360/78.05 |
| 4,864,447 | 9/1989 | Takekado et al. | 360/106 |
| 4,876,623 | 10/1989 | Takekado | 360/104 |
| 5,216,559 | 6/1993 | Springer | 360/78.05 X |
| 5,231,554 | 7/1993 | Goto et al. | 360/104 X |
| 5,452,275 | 9/1995 | Ogawa | 360/78.05 X |
| 5,463,513 | 10/1995 | Hoshino | 360/104 |

FOREIGN PATENT DOCUMENTS

| | | | |
|---|---|---|---|
| 63-291271 | 11/1988 | Japan | 360/78.05 |
| 1-276478 | 11/1989 | Japan . | |
| 2-267782 | 11/1990 | Japan . | |

OTHER PUBLICATIONS

"Basic Studies on Micro Actuator in a Slider for Fine Positioning in Magnetic Hard Disk Drive," Soumoto, et al. JSME No. 920-17 pp. 565-566, '92.

"Head Fine-Motion Mechanism of a Dual-Stage Actuator for Magnetic Disk Drives," Mori, et al JSME IIP '91 pp. 21-22.

*Primary Examiner*—Aristotelis M. Psitos
*Assistant Examiner*—James L. Habermehl
*Attorney, Agent, or Firm*—Oblon, Spivak, McClelland, Maier & Neustadt, P.C.

[57] ABSTRACT

A recording/reproducing apparatus according to the invention comprises a recording medium, a recording/reproducing head for reading and writing information on and from the recording medium, a suspension section attached to the recording/reproducing head, an arm attached to the suspension, first driving means provided between the recording/reproducing head and the suspension section for finely displacing the recording/reproducing head to the suspension, and second driving means for driving the arm to move the recording/reproducing head to a predetermined position on the recording medium.

2 Claims, 12 Drawing Sheets

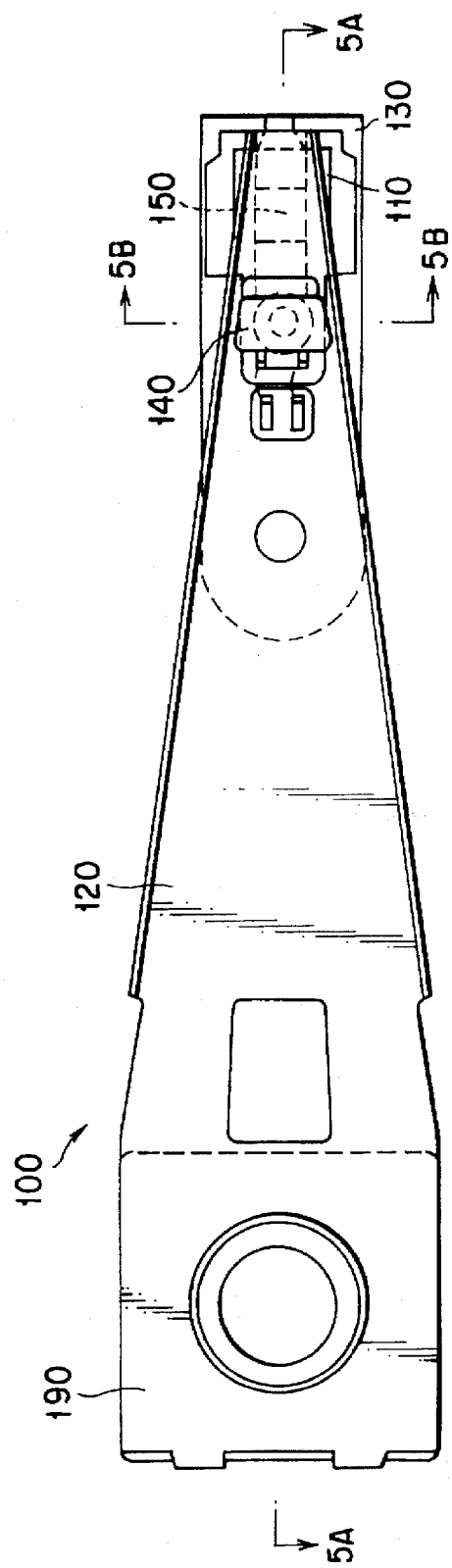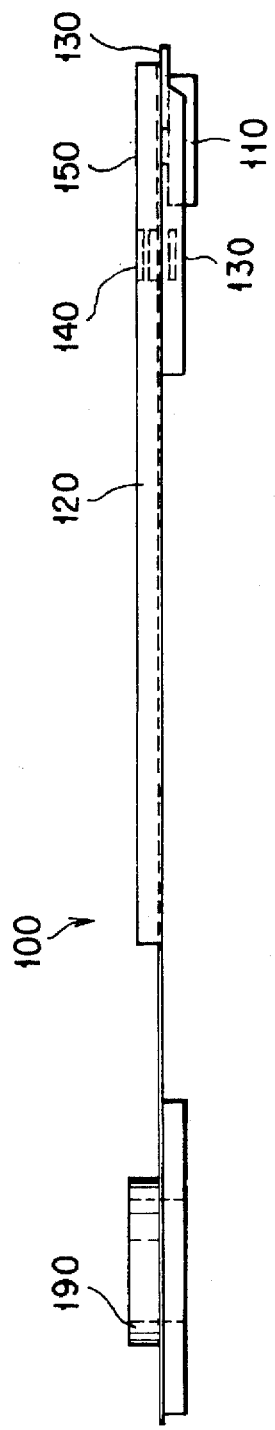
FIG. 5A
FIG. 5B

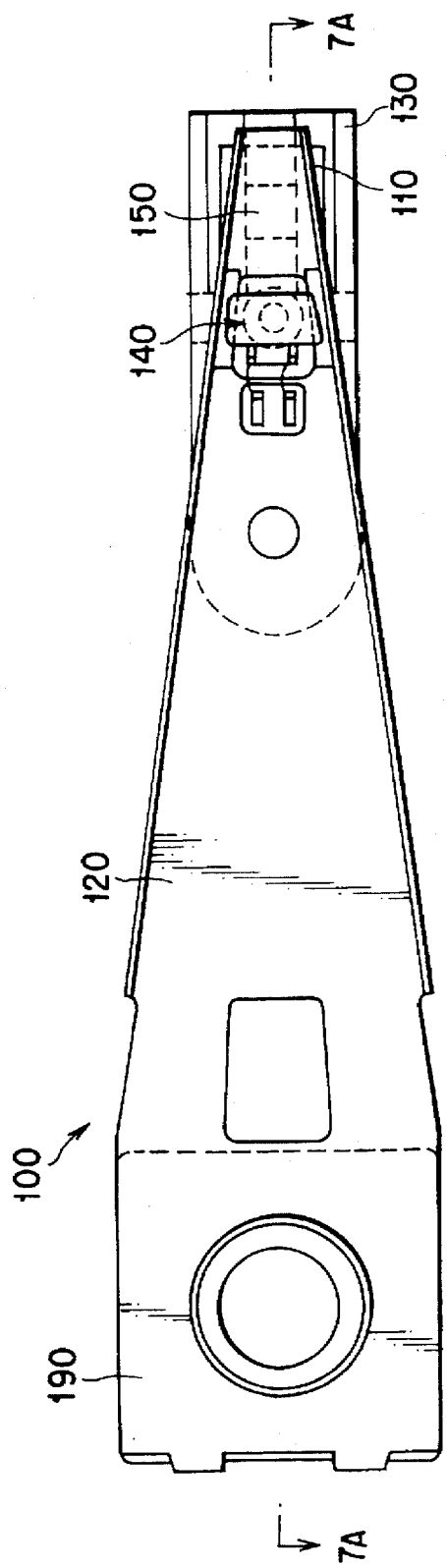
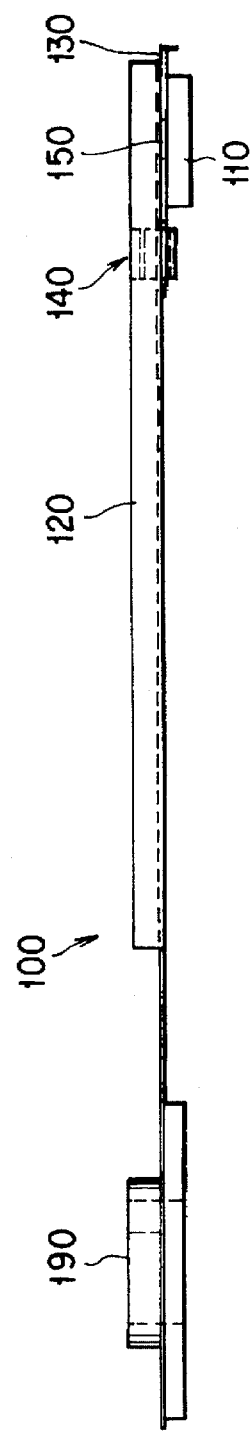
FIG. 7A
FIG. 7B

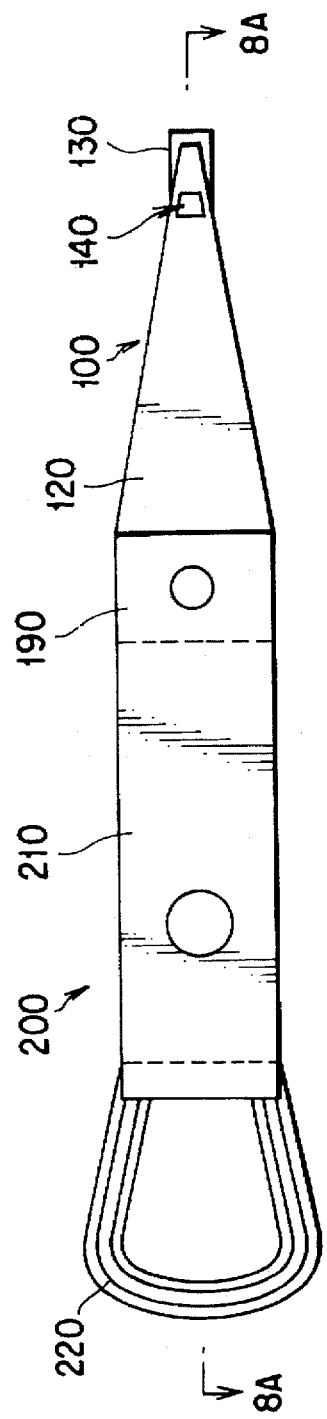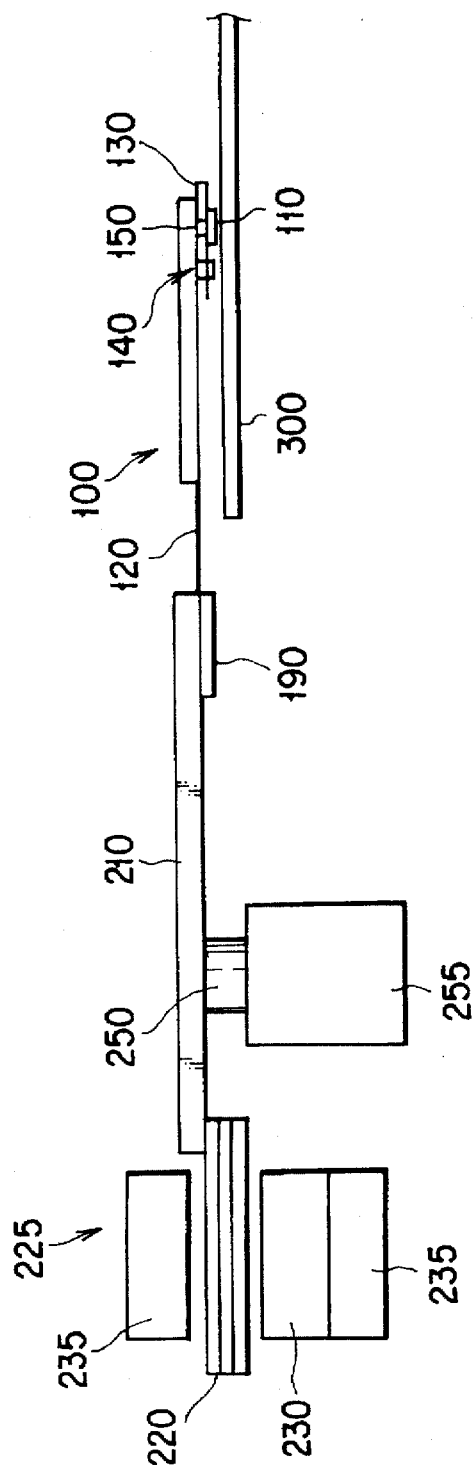

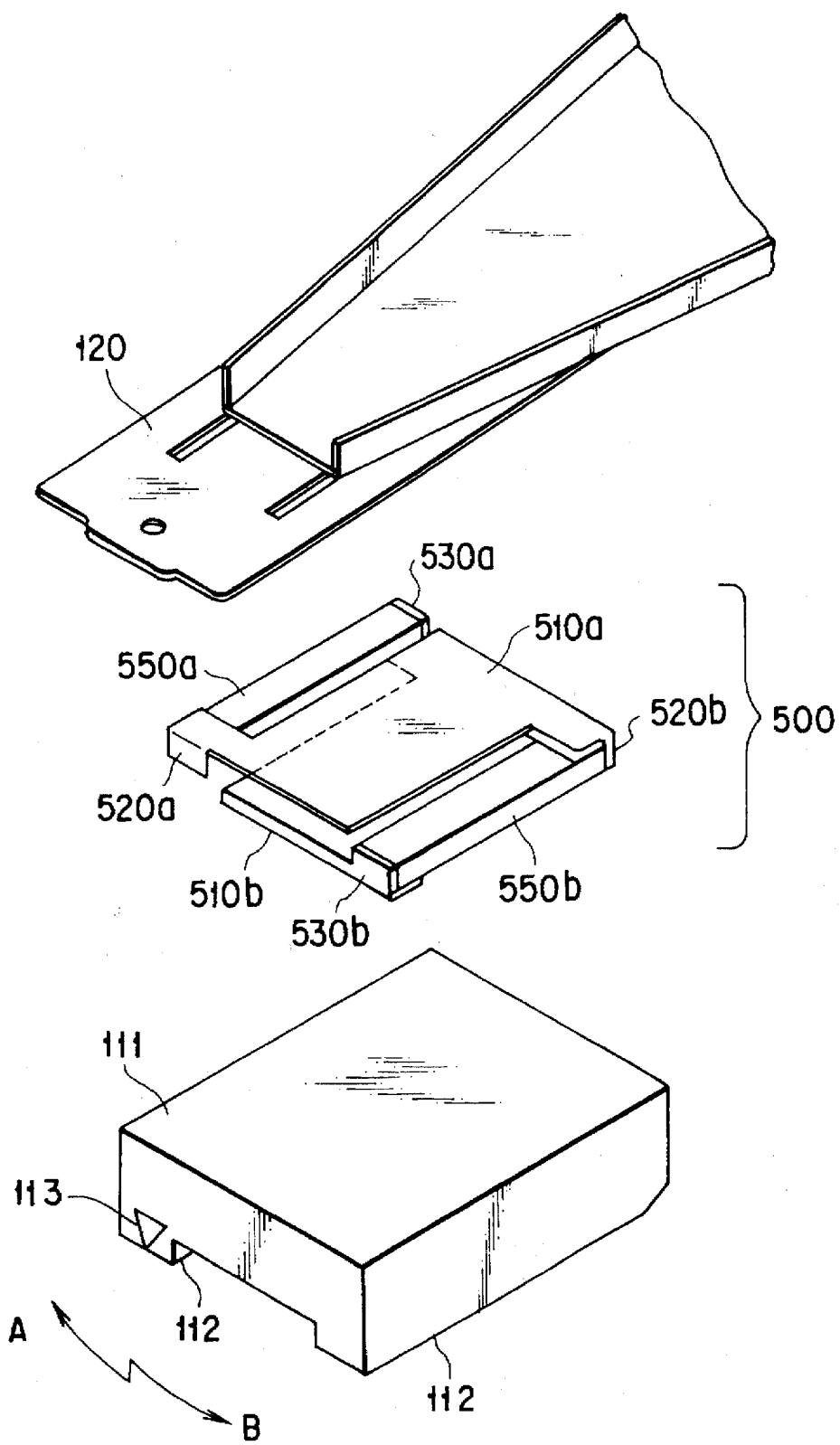
F I G. 11

RECORDING/REPRODUCING APPARATUS WITH COARSE AND FINE HEAD POSITIONING ACTUATORS AND AN ELASTIC HEAD GIMBAL

This application is a continuation of application Ser. No. 08/100,993, filed on Aug. 3, 1993, now abandoned.

BACKGROUND OF THE INVENTION

1. Field of the Invention

The present invention relates to a recording/reproducing apparatus in which a recording/reproducing head is positioned on such as a magnetic recording medium with high accuracy, for recording and reproducing data into and from the medium (hereinafter referred to as "disk").

2. Description of the Related Art

In the following explanation, a magnetic disk drive will be explained as an example of a recording/reproducing apparatus.

Recently, magnetic disk drives have been required to be made compact and to have a large capacity. To this end, a technique for highly densifying data is needed. Densification of data is performed by increasing the bit density (i.e. the recording density in the direction of rotation of a disk) and increasing the track density (i.e. recording density in a radial direction of a disk). To increase the track density, the accuracy of positioning a head must be increased.

A Winchester-type magnetic disk drive as an example of a conventional magnetic disk drive will be explained.

FIG. 1 is a schematic view of a conventional magnetic disk. An actuator 200 is composed of a magnetic head 110, a suspension 120 supporting the head, an arm 210 connected to the suspension, a bearing 240, a rotary shaft 250 (revolving shaft) supporting the arm 210 via the bearing 240, a drive coil 220, and a magnet 230, etc. The drive coil 220 drives the arm 210 to rotate around the rotary shaft 250 so as to position the magnetic head 110 on a predetermined portion of a magnetic disk 300.

FIG. 2A is a plan view, showing in detail the magnetic head employed in the magnetic disk drive shown in FIG. 1. FIG. 2B is a view as viewed from arrows 2A—2A of FIG. 2A.

A magnetic head section 100 includes the suspension 120, a magnetic head 110 consisting of a slide section and a transducer, and a gimbal section 130 attached to the magnetic head 110. The magnetic head section 100 is attached to the arm 210 of the actuator 200 by means of an installation section 140.

In the conventional magnetic disk drive constructed as above, position information read by the head section 100 from the magnetic disk 300 is returned to the actuator 200 (thus forming a positioning servo system), to move and position the magnetic head section 100.

Since the conventional magnetic head section 100 has a resonance frequency of 2 to 3 kHz, the servo-band is only approximately 400 Hz, and hence its positioning accuracy is in the order of only submicrons. However, to increase the recording density of a magnetic disk drive, highly accurate positioning characteristics are required. It is hard for the conventional magnetic head to satisfy this requirement.

Further, non repeatable run-out (hereinafter referred to as an NRRO) of a spindle 310 is a main cause of reducing the positioning accuracy of the magnetic head 110. The NRRO has an amplitude of 1 μm or less, and a frequency of several hundreds Hz to 1 kHz. This makes it difficult for the conventional actuator 200 (hereinafter referred as a coarse motion actuator) to achieve high positioning without influence by the NRRO, since resonant modes made by the suspension 120, arm 210, and drive coil 220 make the system unstable. To overcome this, a dual-stage actuator having a fine motion actuator element for performing fine positioning of the magnetic head 110 has been proposed.

FIGS. 3 and 4 show typical conventional dual-stage actuators. They are disclosed in Mori et al., "Head Fine-Motion Mechanism of a Dual-Stage Actuator for Magnetic Disk Drive", JSME, IIP '91, pp. 21–22, and Soumoto et al., "Basic Studies on Micro Actuator in a Slider for Fine Positioning", JSME, No. 920-17, pp. 656–657, 1992, respectively.

The dual-stage actuator shown in FIG. 3 employs a piezoelectric element 290 at an end of the suspension 120, for performing fine positioning of the magnetic head 110 by finely moving the overall suspension 120 with the head 110. This dual-stage actuator is applicable to a magnetic disk drive and is generally called a "dedicated servo system". In the case of the dedicated servo system, one surface of a plurality of disks serves as a servo surface storing servo information, which is used to position the head on another surface. This conventional dual-stage actuator is useful to correct thermal positional deviation (thermal off-track) caused between different disks.

However, if the above-described fine motion actuator is used to suppress high frequency disturbance such as NRRO, it can be operated at high speed, but the magnetic head 110 cannot be moved to a high frequency band, since it is difficult to effect servo control in a high frequency band to the suspension 120 because of its resonance frequency of, in general, 2 to 3 kHz.

In the case of the dual-stage actuator shown in FIG. 4, its fine motion actuator is formed by burying a piezoelectric element in a slider 111 forming the magnetic head 110. This method is applicable to an embedded servo system. In the case of the embedded servo system, servo information is stored in each surface of disks, and a corresponding head reads the information and returns it to be positioned. Since the fine motion actuator displaces the head itself, the head can be moved even when disturbance of a frequency of about 1 kHz occurs, only if the sampling speed of the servo information is increased. Thus, this dual-stage actuator can be used also to absorb high-frequency fine vibration such as NRRO of the spindle 310.

However, since the head itself is deformed at the time of operating the fine motion actuator, not only displacement in the tracking direction can occur, but also the flying surface 112 of the slider 111 can be twisted or distorted. Thus, stable flying of the head is hard to achieve. Recent years, a head flying height of 0.1 μm or less has been achieved to increase the bit density, and a technique for further reducing the flying height is now being developed. Under these circumstances, if distortion in the order of only 0.01 μm occurs in the flying surface 112 when the magnetic head 110 is displaced in the tracking direction, a change occurs in flying height. Actually, there was a case where an increase in flying height degraded the quality of a signal, and a case where a reduction in flying height brought the magnetic head 110 into contact with the magnetic disk 300, thereby damaging them.

As described above, in the case of the conventional magnetic disk drive, the head positioning accuracy is in the order of submicrons, so that it is difficult to further increase the recording density. Moreover, it is difficult to suppress high frequency disturbance such as NRRO of the spindle, and to appropriately control the flying height of the head.

SUMMARY OF THE INVENTION

It is an object of the invention to provide a recording/reproducing head having a greatly increased positioning accuracy and a recording/reproducing apparatus employing the recording/reproducing head.

It is another object of the invention to provide a recording/reproducing apparatus capable of performing high density recording, suppressing high frequency disturbance, and having high performance and reliability free from influence on flying of the head employed.

A first recording/reproducing apparatus of the present invention is characterized by comprising a recording medium; a recording/reproducing head for reading and writing information on and from the recording medium; a suspension section attached to the recording/reproducing head; an arm attached to the suspension; first driving means provided between the recording/reproducing head and the suspension section for finely displacing the recording/reproducing head to the suspension; and second driving means for driving the arm to move the recording/reproducing head to a predetermined position on the recording medium. In addition, the first recording/reproducing device is characterized by further comprising a viscoelastic member arranged between the recording/reproducing head and the elastic member.

A second recording/reproducing apparatus of the present invention is characterized in that the first driving means includes a first connecting member attached to suspension; a second connecting member attached to the recording/reproducing head; and a driving member which is actively deformable for connecting the first connecting member with the second connecting member in the construction of the first recording/reproducing apparatus.

According to the first aspect of the invention, position information read from the recording medium by means of the recording/reproducing head is fed back to the actuator section, and then the actuator section directly drives the recording/reproducing head. Thus, the recording/reproducing head can be positioned with high accuracy.

In the recording/reproducing apparatus having the above-described recording/reproducing head, the actuator attached to the head performs positioning with a relatively rough positioning error, and the actuator section provided on the head performs accurate positioning with a fine positioning error. As a whole, the recording/reproducing head can be positioned on the recording medium with high accuracy.

According to the second aspect of the invention, the first and second coupling members are coupled with each other by means of a driving member (e.g., a piezoelectric element) to form a thin fine motion mechanism, and the coupling members are connected to the arm and the head, respectively. As a result, there is provided a fine motion actuator capable of finely displacing the recording/reproducing head relative to the arm.

The fine motion actuator capable of finely displacing the recording/reproducing head relative to the arm can be formed also by connecting the head to one end of the driving member and connecting the arm to the other end of the driving member.

Moreover, a recording/reproducing apparatus capable of performing high density recording can be produced by use of the above fine motion actuator.

According to the second aspect of the invention, the recording/reproducing head can be finely displaced relative to the arm without twisting or distorting the flying surface of the slider which forms the head, since no stress is applied to the slider. Thus, there can be provided an actuator for use in a recording/reproducing apparatus and which has high performance and reliability without adversely affecting the flying of the head.

In addition, since the slider having a recording/reproducing section can be directly finely displaced relative to the suspension, there is no influence of resonance in the suspension, and hence high frequency disturbance, such as NRRO of a spindle, can be suppressed. As a result, positioning of the recording/reproducing head in the tracking direction can be performed more accurately, and a recording/reproducing apparatus can be produced which has highly densified tracks and hence can store high density information.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIGS. 5A and 5B are views similar to FIGS. 2A and 2B, showing an example of a magnetic head employed in a magnetic disk drive according to the invention;

FIGS. 7A and 7B show a modification of the magnetic head of FIG. 5;

FIGS. 8A and 8B are schematic views, showing an actuator system employed in the magnetic disk drive according to the invention;

FIG. 11 is an exploded perspective view, showing a second embodiment of a fine motion actuator employed in the magnetic disk drive of the invention;

DETAILED DESCRIPTION OF THE PREFERRED EMBODIMENTS

Figure 1:
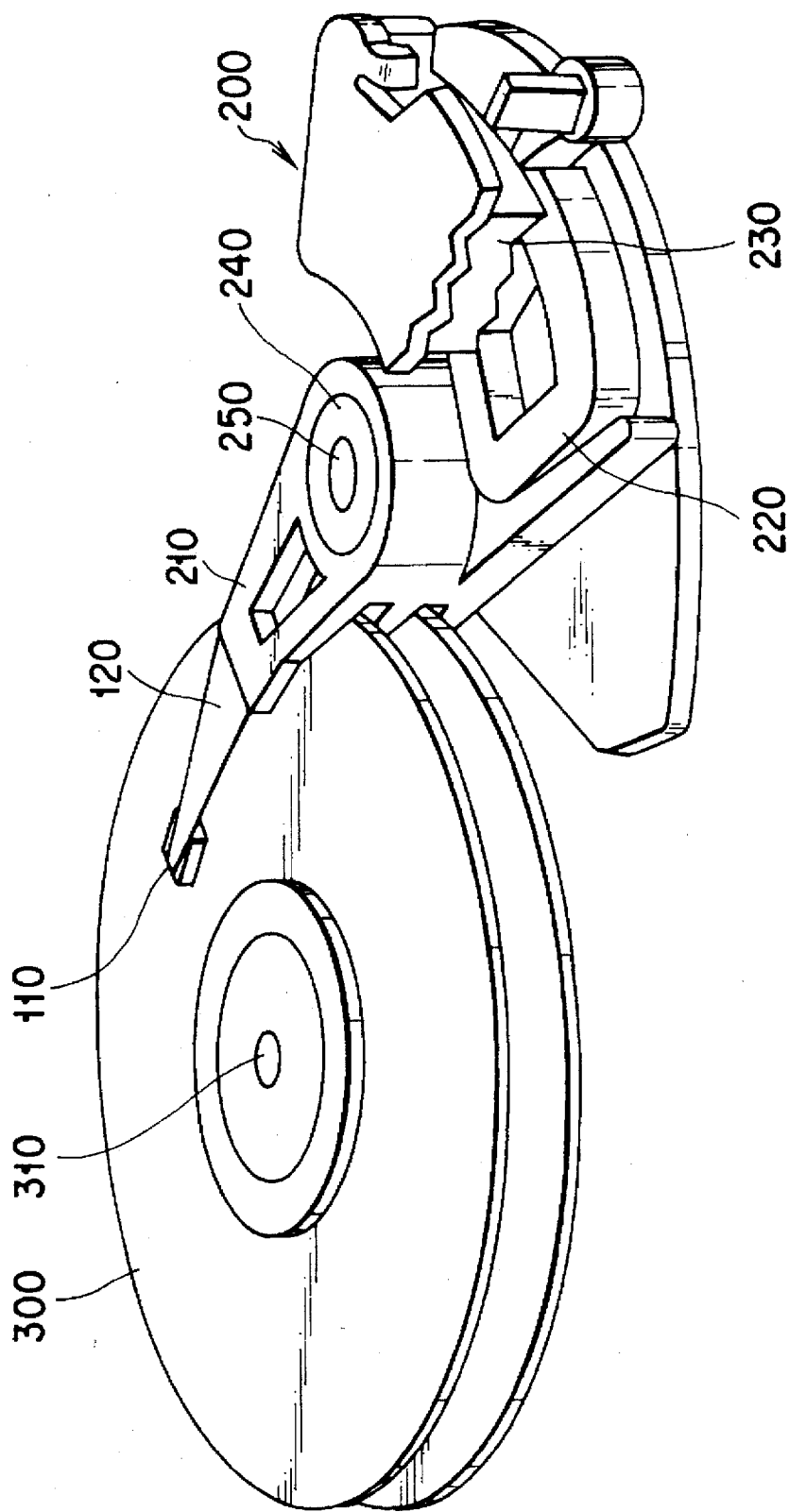
FIG. 1 is a schematic view, showing an actuator employed in a conventional magnetic disk drive.
Figure 2A:
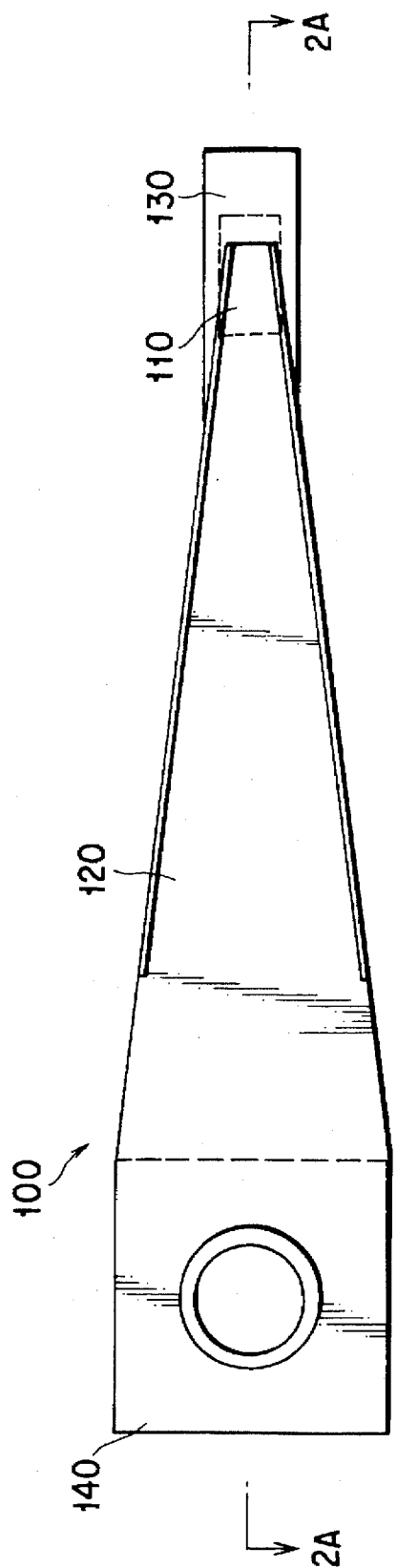
FIG. 2A is a plan view, showing a magnetic head employed in a conventional Winchester-type magnetic disk.
Figure 2B:
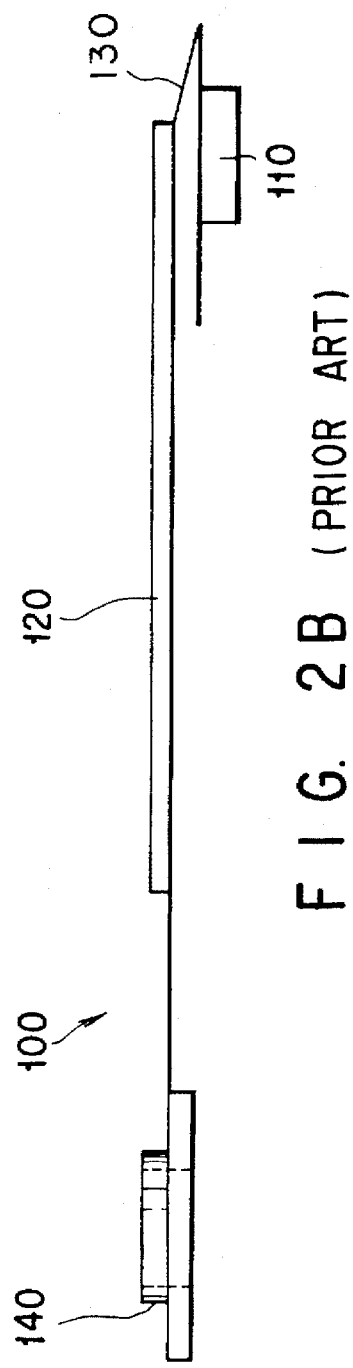
FIG. 2B shows the magnetic head of FIG. 2A as viewed from a direction indicated by arrows A and A.
Figure 3:
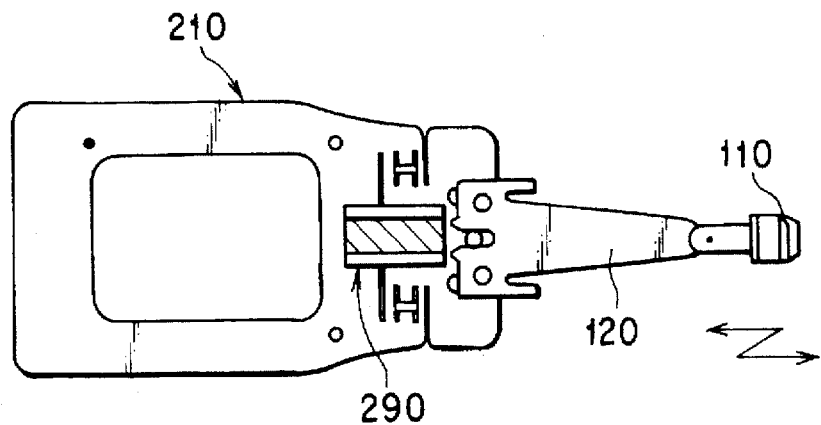
FIG. 3 is a view, showing a typical example of a conventional dual-stage actuator.
Figure 4:
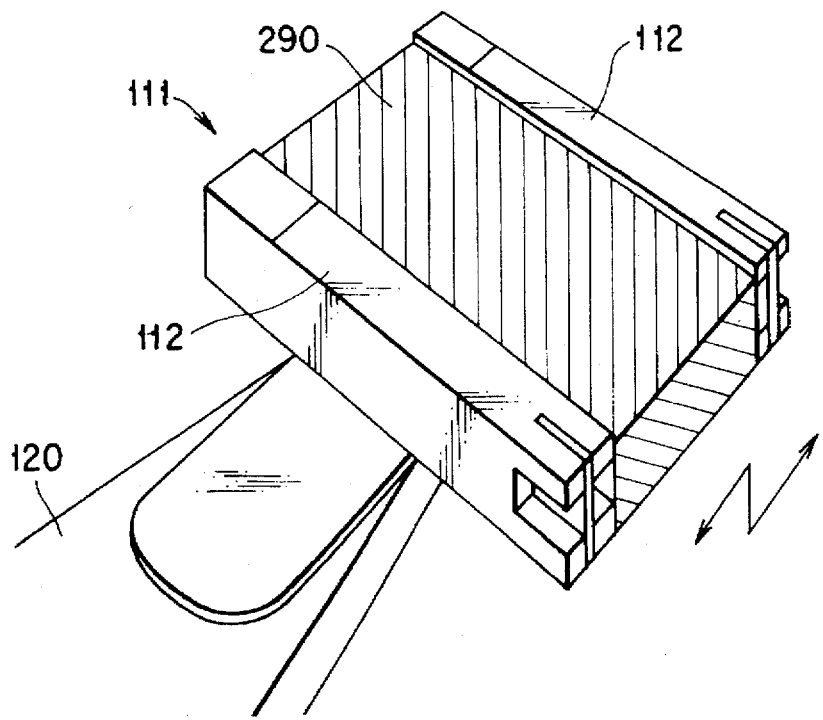
FIG. 4 is a view, showing another typical example of a conventional dual-stage actuator.

In the following explanation, a magnetic disk drive will be explained as an example of the recording/reproducing apparatus. The present invention is not limited to the following case. The present invention can be applied to a light disk device.

The embodiments of the invention will be explained in detail with reference to the accompanying drawings.

An explanation will be given of a Winchester-type magnetic disk drive as an example of a magnetic disk drive.

FIG. 5A is a plan view, showing an example of a magnetic head employed in the magnetic disk drive of the invention, while FIG. 5B shows the magnetic head of FIG. 5A as viewed from a direction indicated by arrows 5A.

A magnetic head section 100 has a magnetic head 110 consisting of a head slider portion and a transducer, a suspension 120, a gimbal section 130 holding the magnetic head 110, an actuator section 140 for actuating the magnetic head 110. A damping member 150 is interposed between the suspension 120 and the gimbal section 130 holding the transducer 110. The damping member 150 is made of a viscoelastic material, and provided for suppressing a resonance peak created by the gimbal section 130 and magnetic head 110. The damping member 150 can suppress vibration of the magnetic head 110 caused by outside vibration. The magnetic head section 100 is attached to an actuator (not shown) via an installation section 190.

Figure 6:
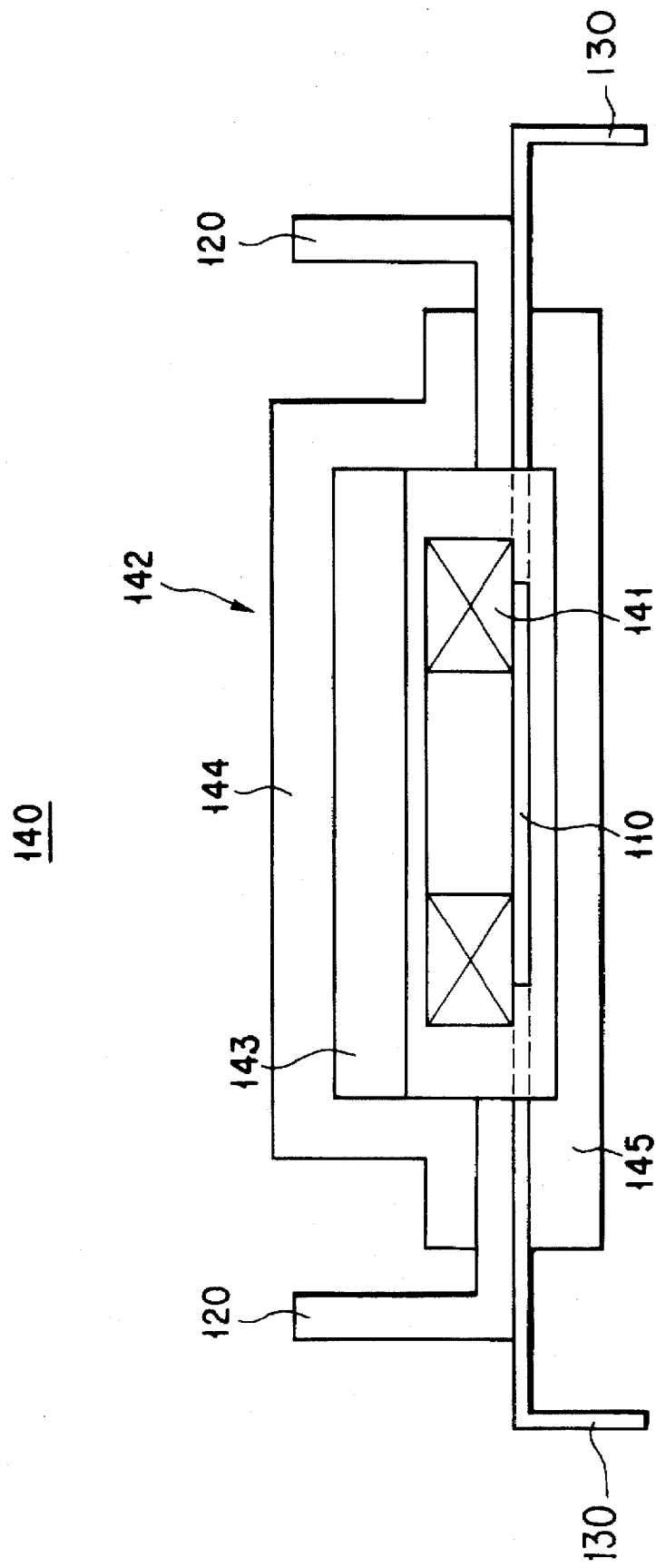
FIG. 6 is a sectional view, showing an actuator section for driving a magnetic head.

FIG. 6 is a cross sectional view taken along lines 5B—5B, showing the actuator section 140 for actuating the magnetic head 110.

The actuator section 140 comprises a driving coil 141 provided on an end of a thin metal plate forming the gimbal 130, and a magnetic circuit 142 surrounding the driving coil 141. The magnetic circuit 142 holds a magnet 143, and comprises a first yoke 144 located in the suspension 120 and a second yoke 145 located in the gimbal section 130.

Position information read by the magnetic head 110 is fed back to the driving coil 141 of the actuator section 140, and used to accurately position the magnetic head 110. Since the actuator section 140 directly actuates the magnetic head 110, the feedback system can be prevented from becoming excessively unstable even if a spring element such as the gimbal section 130 is incorporated in the structure and hence a resonance point is included in the servo-band. Thus, the servo-band frequency can be increased, and a high feedback gain can be obtained. Accordingly, highly accurate positioning can be achieved. Since the actuator section 140 is of an electrokinetic type and can create a relatively great stroke and force, a signal indicative of position information can be prevented from deviating from the feedback loop even if great disturbance enters. Therefore, the positioning characteristics can be maintained at high level.

The magnetic head 110 magnetically reads a signal. It is possible that the amount of noise is increased by a magnetic field which is created by a driving current flowing through the driving coil 141. However, almost all of the magnetic field created by the driving current flows through a magnetic circuit, and the frequency of a signal processed by the magnetic head 110 is in the order of as high as Mega-Hertz. Further, the frequency of the magnetic field created by the driving current is in the order of not more than Kilo-Hertz. Accordingly, influence of noise upon a signal indicative of position information can be ignored by filtering the signal. However, in a case where a high frequency component cannot be ignored while such as PWM (pulse width modulation) driving, it is necessary to magnetically shield the magnetic head 110.

FIGS. 7A and 7B show a modification of the magnetic head of FIG. 5. A magnetic head 100 shown in FIGS. 7A and 7B has a basic structure similar to that of FIG. 5A and 5B. In FIGS. 7A and 7B, elements similar to those shown in FIGS. 5A and 5B are designated by corresponding reference numerals, and their detailed explanation is omitted. This modification differs from the device shown in FIGS. 5A and 5B in that the gimbal section 130 has a different configuration, but can provide an advantage similar to that obtained by the device shown in FIGS. 5A and 5B.

The operation of the magnetic disk drive employing the magnetic head section 100 will now be explained.

FIGS. 8A and 8B are schematic views, showing an actuator system employed in the magnetic disk drive of the invention. In these figures, the elements of a magnetic head section 100 similar to those shown in FIG. 5 are designated by corresponding reference numerals, and their explanation is omitted. FIG. 8B is a view as viewed from arrows 8A and 8A of FIG. 8A.

An actuator 200 comprises a driving coil 220, a magnet 230 and a yoke 235 which form a magnetic circuit 225, an arm 210, and a rotary shaft 250 rotatably supporting the arm 210. The magnetic head section 100 is secured to the arm 210. A pivot section 255 with a bearing supporting the rotary shaft 250 is fixed on a frame (not shown).

For easy understanding, the actuator section 140 provided at the magnetic head section 100 is called "fine motion actuator 140", while the actuator 200 is called "coarse motion actuator 200".

Position information read from a magnetic disk 300 by means of a magnetic head 110 incorporated in the magnetic head 100 is returned to the driving coil 141 of the fine motion actuator 140, and the driving coil 220 of the coarse motion actuator 200, thereby positioning the magnetic head 110 with high accuracy.

The coarse motion actuator 200 has a stroke as large as to enable the magnetic head section 100 to move in the radial direction of the magnetic disk 300, and hence has a relatively low resonance frequency. On the other hand, the fine motion actuator 140 can have a very compact size since it needs only a small stroke corresponding to fine motion, and can have a considerably high resonance frequency. The positioning servo system of the magnetic disk drive according to the invention consists of two actuators 140 and 200. Specifically, the coarse motion actuator 200 performs motion of a large amplitude, whereas the fine motion actuator 140 performs motion of a fine amplitude.

Figure 9:
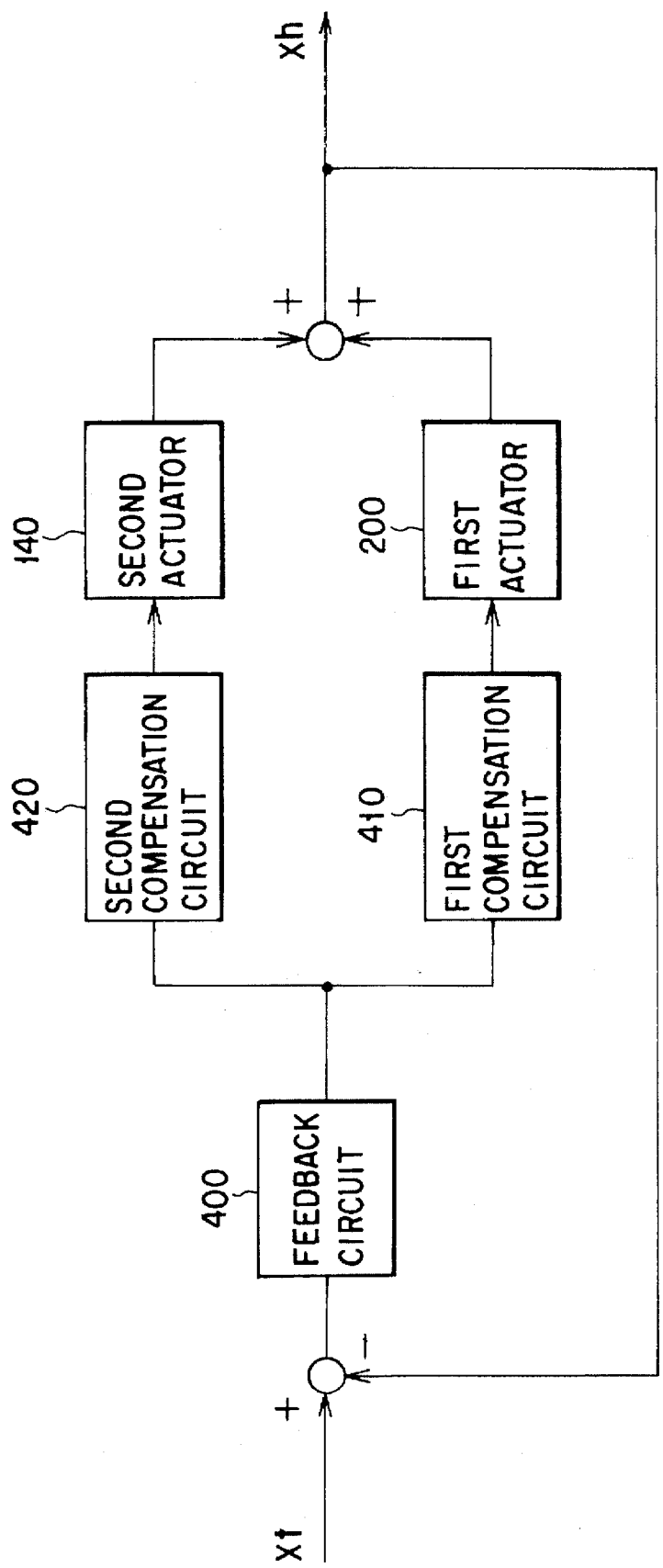
FIG. 9 is a schematic view, showing a servo system for positioning the magnetic head.

FIG. 9 is a schematic block diagram, showing the positioning servo system of the magnetic head according to the first embodiment.

Position information Xt stored on the magnetic disk as a magnetic recording medium is read by the magnetic head 110 of the magnetic head 100, and is then converted to position error signals by a feedback circuit 400. The position error signals are sorted into signals in a high frequency region and those in a low frequency region, since the signal in the high frequency region has a small amplitude, and the signal in the low frequency region has a large amplitude. The signal in the high frequency region is fed back to the fine motion actuator 140, and the signal in the low frequency region to the coarse motion actuator 200.

More specifically, as is shown in FIG. 9, the position error signal, whose low frequency component is cut by means of a second compensation circuit 420 which includes a low-cut filter section, is supplied to the fine motion actuator 140. On the other hand, the position error signal, whose high frequency component is cut by means of a first compensation circuit 410 which includes a high-cut filter section and is connected in parallel with the second compensation circuit 420, is supplied to the coarse motion actuator 200. Thus, the first motion actuator 140 and coarse motion actuator 200 cooperate to produce the position information Xh of the magnetic head 110.

As described above, the coarse motion actuator 200 performs rough positioning with a relatively rough error, and the fine motion actuator 140 performs fine positioning with a relatively fine error, thereby achieving highly accurate positioning as a whole.

Since the high-cut filter section is incorporated in a signal loop for the coarse motion actuator 200, the coarse motion actuator 200 can be controlled in a reliable manner.

In the embodiment, the feedback circuit 400 may consist of a CPU, etc., of a digital structure. In this case, it is not necessary to employ a particular logical circuit corresponding to the high-cut filter section in the second compensation circuit 420. A high frequency component can be cut only by removing portions of a signal. Although in this case a low noise component is inevitably contained in a signal, this noise can sufficiently be compensated by the fine motion actuator 140.

Figure 10:
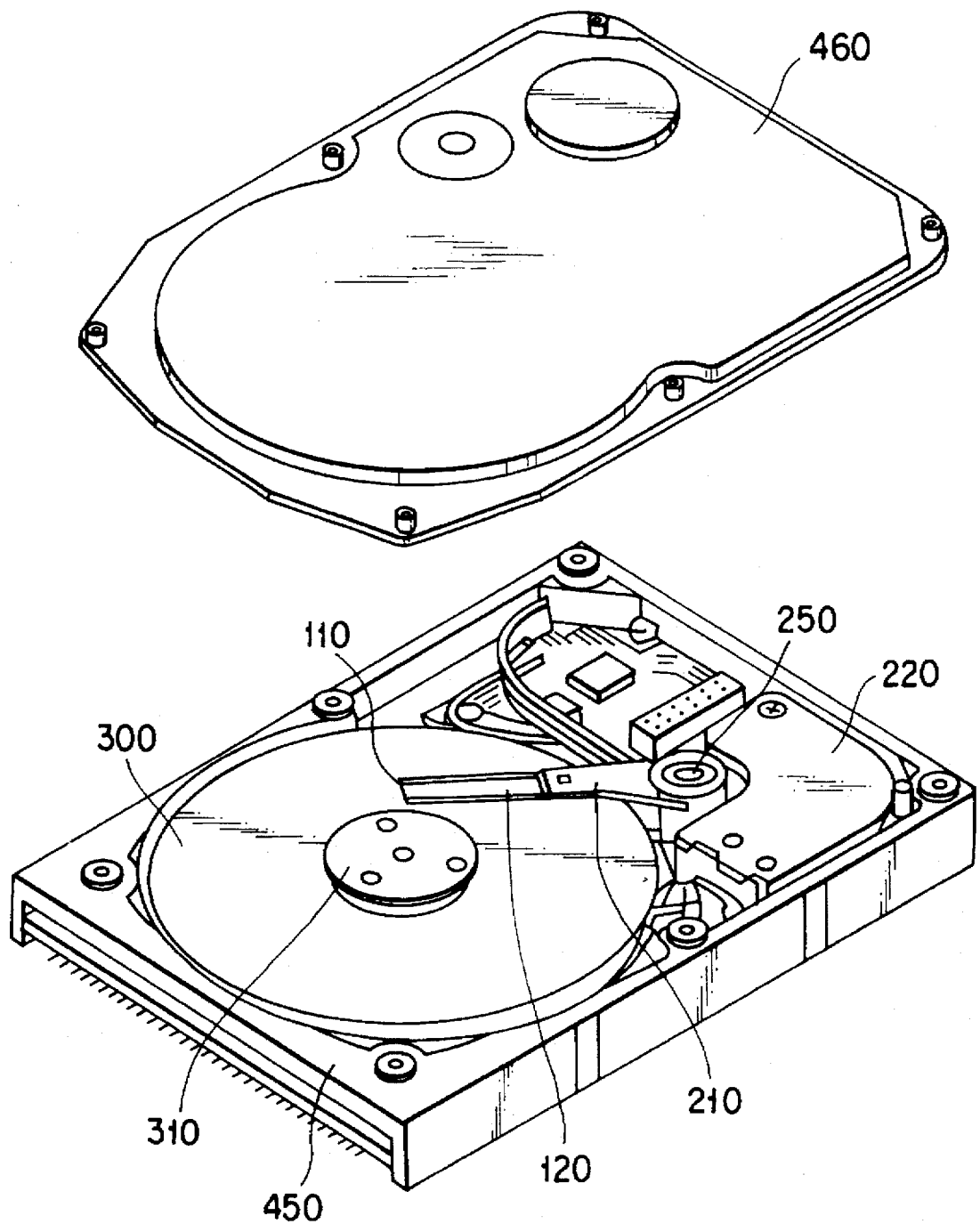
FIG. 10 is a diagram, showing a magnetic disk drive employing the actuator.

FIG. 10 schematically shows an entire magnetic disk drive having an actuator according to the magnetic disk drive of the invention.

A magnetic disk drive 300 for storing information is supported by a spindle 310 and is rotated at a predetermined speed. A magnetic head 110 is attached to a tip portion of a thin platelike suspension 120, for accessing the disk 300 and reproducing the data stored thereon. The suspension 120 is connected to one end of an arm 210 having a bobbin section for holding a driving coil (not shown), etc. A function similar to that of the suspension 120 can be achieved by use of a thin film obtained by working a tip portion of the arm 210.

The arm 210 has the other end provided with a voice coil motor 220, which is a type of a linear motor. The voice coil motor 220 comprises a driving coil (not shown) wound up in the bobbin section of the arm 210, and a magnetic circuit consisting of a permanent magnet and a yoke (which are also not shown) opposed to the coil such that the coil is interposed therebetween.

The arm 210 is held by ball bearings provided at upper and lower portions of a fixing shaft 250 such that the arm can be rotated and swung by means of the voice coil motor 220.

Positioning of the magnetic head 110 on the magnetic disk 300 is performed by reading servo information written in the magnetic disk 300 by means of the head 110, then feeding back the information to the voice coil motor and rotating the arm 210 by a positioning servo system.

The above-described component parts are housed in a housing 450, which is covered by a cover 460.

FIG. 11 is an exploded perspective view, showing a second embodiment of the fine motion actuator employed in the magnetic disk drive of the invention.

This fine motion actuator is characterized in that a thin fine motion mechanism section 500 is located between the suspension 120 and the slider 111 of the magnetic head 110, as is shown in FIG. 11. The mechanism section 500 comprises a pair of thin plates 510a and 510b which face each other, and a pair of piezoelectric elements 550a and 550b which consist of actively deformable driving members and can contract and expand by controlling a voltage applied thereto.

The thin plate 510a has opposite bent portions 520a and 520b located diagonally and connected to the piezoelectric elements 550a and 550b, respectively. The thin plate 510b has opposite bent portions 530a and 530b located diagonally and connected to those ends of the piezoelectric elements 550a and 550b, which are not connected to the bent portions 520a and 520b. Thus, the thin plates 510a and 510b and the piezoelectric elements 550a and 550b are formed integral as the fine motion mechanism section 500. Further, the thin plate 510a is secured to the suspension 120, and the other plate 510b is secured to the slider 111, thereby forming a fine motion actuator capable of finely displacing the slider 111 relative to the suspension 120.

Expanding the piezoelectric elements 550a and 550b displaces a transducer 113, provided at the tip of the slider 111, on the magnetic disk 300 in the direction indicated by arrow A. On the other hand, contracting the piezoelectric elements 550a and 550b displaces the transducer 113 in the direction indicated by arrow B.

Since no stress is applied to the slider 111 at the time of fine displacement, no twisting or distortion of the flying surface 112 of the slider 111 occurs. As a result, an actuator having high performance and reliability, which never adversely affects the flying operation of the magnetic head 110, can be provided.

Since the slider 111 having the transducer 113 can be directly finely displaced relative to the suspension 120, the section 113 is not influenced by resonance of the suspension 120, etc., and hence high frequency disturbance, such as NRRO of the spindle 310, can be suppressed. As a result, the positioning accuracy of the magnetic head 110 in the tracking direction is enhanced, thereby enabling production of a magnetic disk which employs highly densified tracks and can hence perform high density recording.

Figure 12:
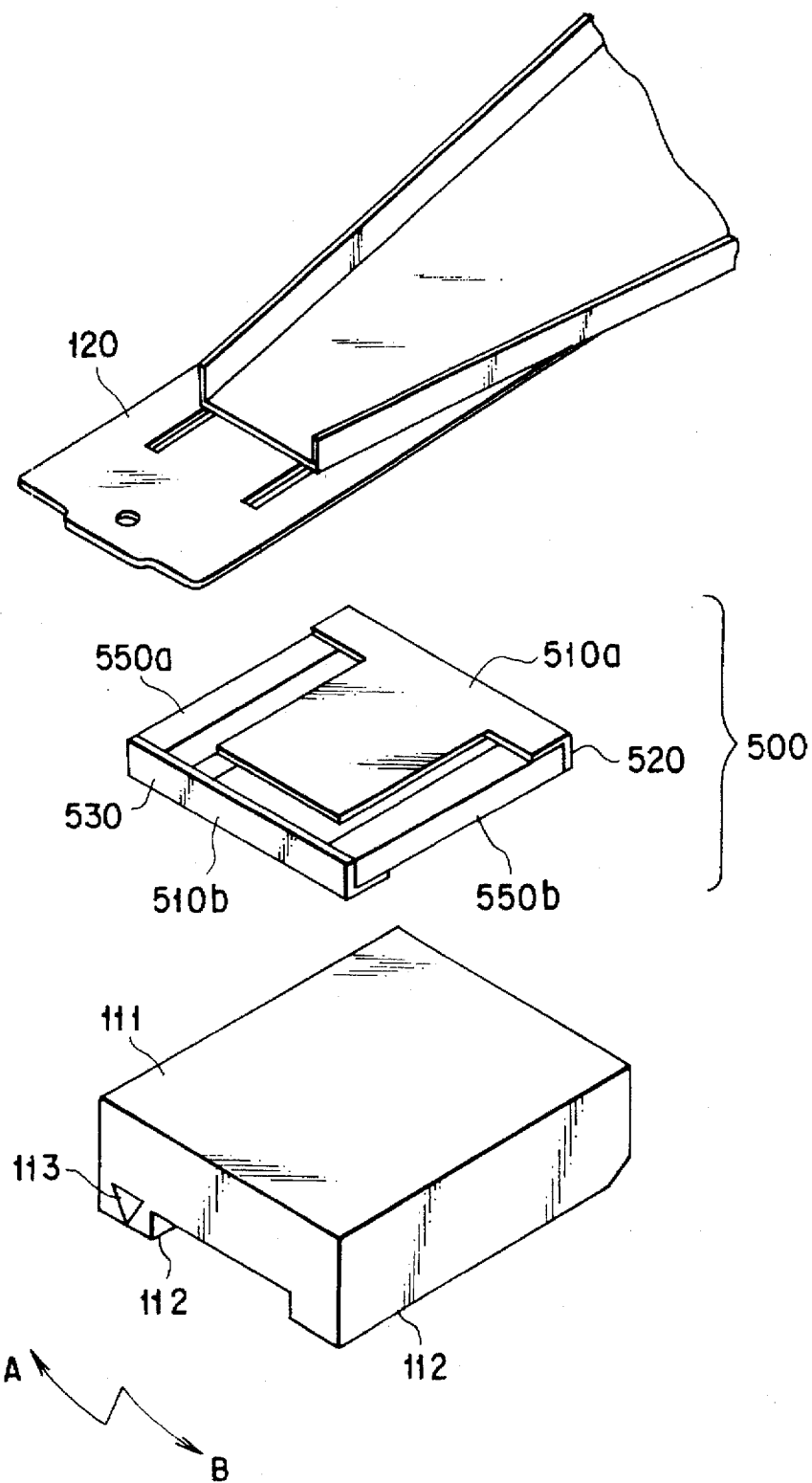
FIG. 12 is an exploded perspective view, showing a modification of the second embodiment of the fine motion actuator employed in the magnetic disk drive of the invention.

FIG. 12 is an exploded perspective view, showing a modification of a second embodiment of the fine motion actuator employed in the magnetic disk drive of the invention. In FIG. 12, elements similar to those shown in FIG. 11 are denoted by corresponding reference numerals, and their explanation is omitted.

A fine motion mechanism section 500 comprises a pair of thin plates 510a and 510b which face each other, and a pair of piezoelectric elements 550a and 550b which consist of actively deformable driving members and can contract and expand by controlling a voltage applied thereto. The thin plate 510a has a bent portion 520 whose opposite ends are connected to the piezoelectric elements 550a and 550b, respectively. The thin plate 510b has a bent portion 530 connected to the piezoelectric elements 550a and 550b. Thus, the thin plates 510a and 510b and the piezoelectric elements 550a and 550b are formed integral as the fine motion mechanism section 500.

Further, the thin plate 510a is secured to the suspension 120, and the other plate 510b to the slider 111, thereby forming a fine motion actuator capable of finely displacing the slider 111 relative to the suspension 120. By bending the piezoelectric elements 550a and 550b in the same direction in a plane parallel with the flying surface 112 of the slider 111, a transducer 113, provided at the tip of the slider 111, can be finely moved on the magnetic disk 300 in the direction indicated by arrow A or B. Even if the embodiment employs only one of the piezoelectric elements 550a and 550b, this example can have a function similar to that of the first embodiment.

Although in the second embodiment and its modification of the above-described fine motion actuators, a piezoelectric element is used as an actively deformable driving member, the invention is not limited to this, but may employ other driving members (made of, e.g., a shape memory alloy or a magnetostrictive material). Further, it is not always necessary to align the longitudinal direction of the fine motion mechanism section 500 with that of the slider 111, as is shown in FIGS. 11 and 12. The slider 111 may be located in a desired direction relative to the fine motion mechanism section 500.

Figure 13:
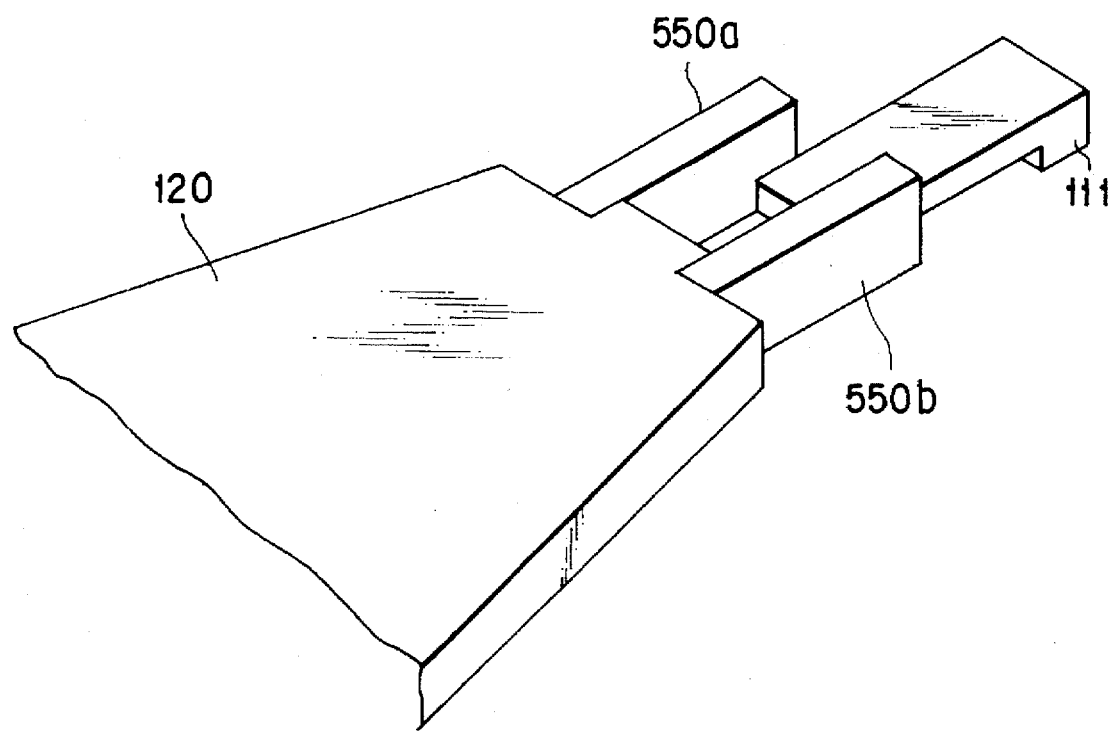
FIG. 13 is an exploded perspective view, showing a third embodiment of the fine motion actuator employed in the magnetic disk drive of the invention.

FIG. 13 is a perspective view, showing a third embodiment of the fine motion actuator employed in the magnetic disk drive of the invention. In FIG. 13, elements similar to those shown in FIGS. 11 are designated by corresponding reference numerals, and their detailed explanation is omitted.

In this embodiment, the fine motion mechanism section consists only of a pair of piezoelectric elements 550a and 550b which are actively deformable driving members and can contract and expand by controlling a voltage applied thereto.

One end of each of the piezoelectric elements 550a and 550b is connected to a slider 111, and the other end is connected to a suspension 120. Bending the elements 550a and 550b can finely deform the slider 111 relative to the suspension 120. In this embodiment, the slider 111 has a very small size, as is shown in FIG. 13. Therefore, this example is applicable to a case where the fine mechanism section is not required to have high rigidity. In particular, this example is effective to a contact-type slider, not to a complete flying type one. Moreover, although the piezoelectric elements 550a and 550b are made of a bendy material, they may be made of a contractible material, or they may consist of a combination of a bendy member and a contractible member.

The invention can provide a magnetic actuator which can suppress high frequency disturbance, such as NRRO of the spindle, and which has high performance and reliability without adversely affecting the flying of the head, and can provide a magnetic disk drive having the actuator and capable of performing high density recording.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A recording/reproducing apparatus for use with a recording medium, the recording/reproducing apparatus comprising:

a recording/reproducing head for reading and writing information on and to said recording medium;

a suspension arm having a first end and second end;

a connecting member, arranged between said recording/reproducing bead and said suspension arm, for supporting said recording/reproducing head to said suspension arm;

first driving means attached between said first end of said suspension arm and said recording/reproducing head parallel to said connecting member for finely moving said recording/reproducing head relative to said suspension arm; and second driving means attached to said second end of said suspension arm for coarsely moving said first end of said suspension arm to move said recording/reproducing head to a desired position on said recording medium, wherein said first driving means comprises:

an elastic member arranged between said recording/reproducing head and said suspension arm, wherein said elastic member functions as a gimbal;

a driving coil arranged at one end of said elastic member; and a magnetic circuit surrounding said driving coil.

2. The apparatus of claim 1, wherein, a portion of said suspension means extends beyond the second driving means away from the first end;

wherein, the gimbal extends in a direction of the portion of said suspension means and has a gap between the portion and the gimbal;

wherein, the gimbal is parallel to a recording medium during recording/reproducing; and wherein, the damping member is interposed in the gap.

* * * * *